UNITED STATES PATENT OFFICE 2,684,464

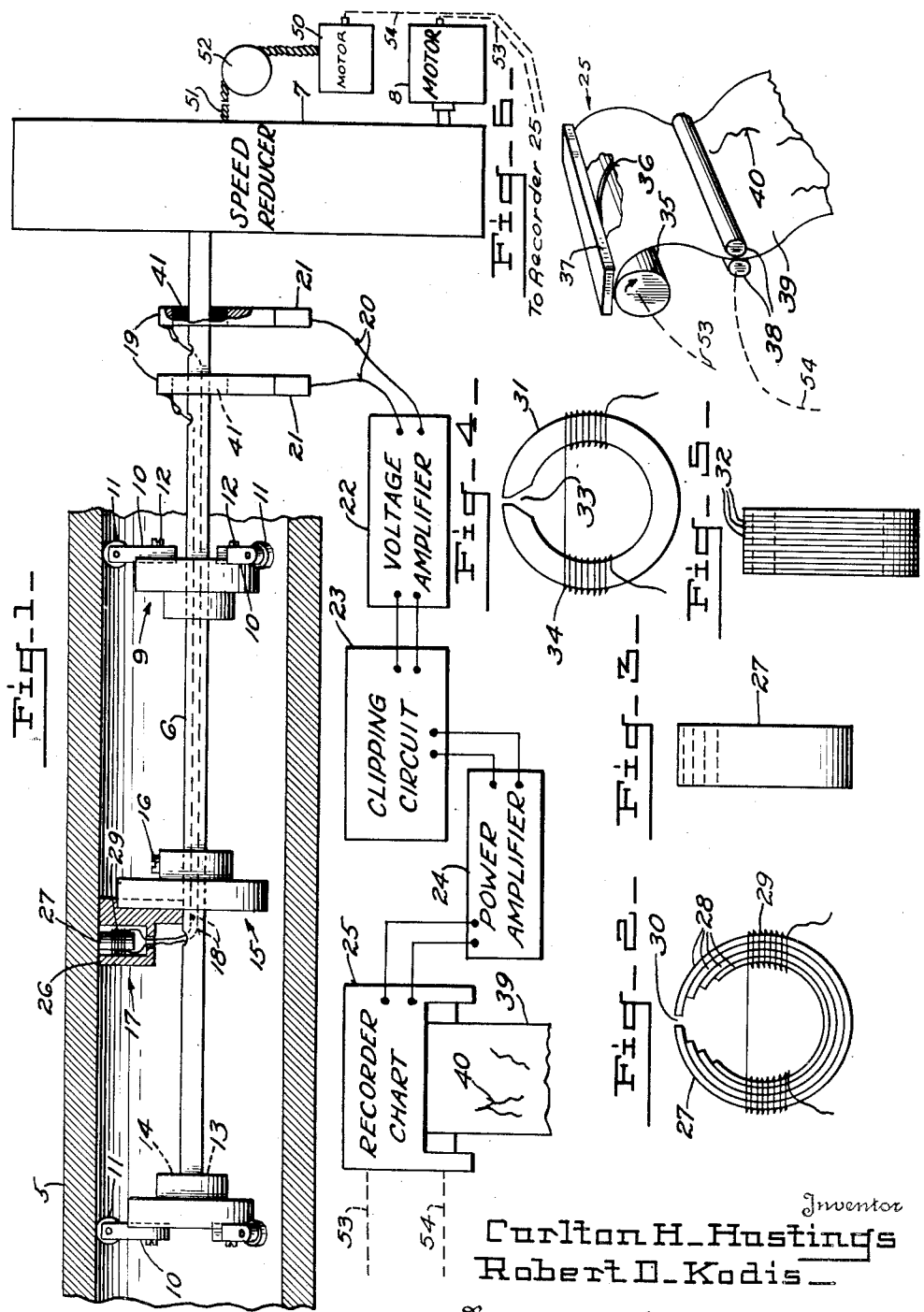

METHOD AND APPARATUS FOR THE DETECTION OF FLAWS IN FERROMAGNETIC MATERIALS

Carlton H. Hastings, West Newton, and Robert D. Kodis, Roxbury, Mass.

Application October 6, 1950, Serial No. 188,859

6 Claims. (Cl. 324—37)

(Granted under Title 35, U. S. Code (1952), sec. 266)

The invention described in the following specification and claims may be manufactured and used by or for the Government for governmental purposes without the payment to us of any royalty thereon.

This invention relates to non-destructive magnetic testing and is more particularly directed to improved means for locating inhomogeneities in ferromagnetic materials.

In the manufacture of ferrous tubing for gun and cannon barrels, it is extremely difficult to prevent the occurrence of such inhomogeneities as cracks, fissures, non-metallic inclusions, stress concentrations, and the like. As a result, rigid inspection techniques must be followed in order to detect the existence of the aforesaid inhomogeneities, hereinafter also referred to as "flaws." Various methods and apparatus have been developed for carrying out such inspection, but the prior art does not readily lend itself to the proper evaluation between these defects which would necessitate rejection of the tubes and those which may be safely disregarded under the rigid specifications which control acceptance. It is, therefore, apparent that the mere detection of existing flaws does not offer adequate knowledge of their character and effect. Their nature, actual location, shape, and extent must be accurately determined as well.

One existing method of detecting flaws in ferromagnetic tubes consists of passing a direct current through the tube so that the resulting magnetic field will be distorted in the immediate vicinity of any defects therein and then utilizing such distortions to vary the induced electromotive force in an electromagnetic search coil arranged for scanning the bore surface of the tube. The resulting signal emitted by the search coil is then amplified and recorded by a conventional current or voltage indicating device such as, for example, a deflection meter or a cathode ray oscilloscope.

However, the particular apparatus utilized in the above method fails to provide the degree of discrimination necessary to accurately evaluate the actual extent and magnitude of each individual flaw. For example, it was found that when several flaws occurred in close relationship to one another, the resulting signal was too broad to properly define the existence of each separate flaw. It can, therefore, be readily seen that several small allowable cracks could very likely be interpreted as one large crack, thereby leading to unwarranted rejection of the tube under scrutiny.

Another difficulty inherent in the above-mentioned apparatus is the inability of the apparatus to clearly distinguish between the signals produced by inhomogeneities of different natures as, for example, between cracks and the similar signals resulting from stress concentrations in the physical structure of the metal. Since the definition afforded by the usual type of detector coil is inversely proportional to its size, the logical solution to the aforesaid lack of discrimination would appear to be a substantial decrease in the overall size of the coil. However, such course would present practical construction and operational problems which could not be readily overcome without unduly complicating and prolonging the entire inspection procedure.

Accordingly, it is one of the objects of this invention to provide a method and apparatus for depicting inhomogeneities in ferromagnetic tubes even where such inhomogeneities consist of several closely related cracks and/or a combination of cracks and stress concentrations.

It is a further object of this invention to provide in flaw detection apparatus an improved search coil wherein the resolution thereof is not dependent upon the over-all size of the coil itself.

Another object of this invention resides in the provision of a search coil for magnetic flaw detection apparatus wherein the resolution of the coil depends upon the size of a low permeability gap in the magnetic circuit thereof.

Another unsatisfactory drawback in existing flaw detection apparatus lies in the type of recording instrumentation used to indicate the desired data regarding the flaws in the tubes. Meters, cathode ray oscilloscopes and strip chart pen recorders are customarily employed in prior art apparatus. However, the numerical data presented by the meter deflection as well as the visual trace obtained from the oscilloscope or pen recorder does not permit adequate correlation between the various types and shapes of the particular flaws known to produce a definite deflection or trace. Obviously, the numerous types and shapes of those flaws found to occur in ferrous tubes render it extremely difficult for even the highest type of skilled operator to evaluate accurately the recorded data. Furthermore, in the event a pen recorder is employed, the mechanical lag inherent therein definitely prohibits any desirable increase in the rate of operation. In the case of a meter or an oscilloscope, the speed of scanning is, of course, limited by the ability of the operator to recognize rapid deflections.

An additional object of this invention, therefore, is to provide recording means for flaw detection apparatus wherein the recorded signal is substantially a facsimile of the flaw producing such signal.

Still another object of the present invention is to provide flaw detection apparatus wherein the recording means thereof is fully responsive to a magnetic recording type of scanning detector.

A specific object of this invention resides in the novel combination of a facsimile recording device with a detector coil whose resolving ability depends upon a low permeability gap in the magnetic circuit thereof.

The specific nature of the invention as well as other objects and advantages thereof will clearly appear from a description of a preferred embodiment as shown in the accompanying drawings in which:

Fig. 1 is a schematic representation of the flaw detection apparatus of this invention;

Fig. 2 is an elevational end view of one form of detector head;

Fig. 3 is an elevational side view of the detector head illustrated in Fig. 2;

Fig. 4 is an elevational end view of an alternate construction for the detector head;

Fig. 5 is an elevational side view of the detector head illustrated in Fig. 4; and Fig. 6 is a perspective view of the recorder utilized in the present invention showing the typical pictorial information obtained when flaws exist in the magnetizable tube under inspection.

There is illustrated in Fig. 1 a portion of a tubular body 5 adapted to be inspected for flaws with the method and apparatus of this invention. A hollow shaft 6 is fixedly mounted by suitable means to a speed reducer 7 driven by a conventional motor 8. A pair of bearing members 9 are each provided with a hub portion 13 having a ball race 14 therein fixedly secured to shaft 6. Thus shaft 6 will rotate independently of bearing members 9. Members 9 are preferably disposed adjacent the respective front and rear ends of shaft 6. A plurality of radially disposed arms 10 are slidably carried by each member 9 and each arm terminates at its outer end in a roller 11. A set screw 12 or the like is arranged to lock each arm 10 in the particular adjusted position wherein rollers 11 are in rolling contact with the inner bore surface of tube 5.

Substantially midway between bearing members 9 a support member 15 is fixedly secured by screw means 16 or the like to shaft 6. A detector head 17 is slidably mounted in support member 15 and is arranged to be adjustably secured therein by suitable means (not shown) so as to be in close proximity to the inner bore surface of tube 5. A pair of suitably insulated leads 18 extend from detector head 17 and are preferably led through the hollow intereior of shaft 6 to slip rings 19 mounted thereon in the vicinity of speed reducer 7. Slip rings 19 are insulated from shaft 6 by an inner non-conducting portion as shown at 41 and serve to transfer electrical current from leads 18 to similar leads 20 through the medium of stationary carbon brushes 21 in a manner well known in the art. Leads 20 connect slip rings 19 in turn to a voltage amplifier 22, a so-called "clipping circuit" 23, a power amplifier 24, and a facsimile recording unit 25.

Detector head 17 is of the type illustrated in U. S. Patent No. 2,468,601 in the name of Thomas H. Long and as stated therein is commonly employed in magnetic recording machines for impressing on or reading back a recording from a suitable tape or wire. It has been discovered that this type of magnetic recording head is particularly well adapted for use in the method and apparatus of this invention.

Accordingly, the detector head 17 in the apparatus of the present invention preferably comprises a cylindrical frame 26 of non-magnetic material such as brass, plastic, or the like; a core 27 formed by a series of substantially cylindrical laminations 28 of magnetic material, such as transformer iron; and a double winding 29 of electrically conducting wire about opposite sides of core 27. As best shown in Fig. 2, the ends of laminations 28 are separated sufficiently to leave a non-magnetic gap 30. The showing of such gap is exaggerated in the drawings for ease of illustration. In order to provide maximum flux concentration about gap 30, the amount of separation between the ends of laminations 28 is progressively decreased from the innermost to the outermost. It should be here mentioned that the resolvability of detector head 17 is dependent upon the size of gap 30. Thus, the smaller gap 30 is made, the greater will be its definition in responding to magnetic field leakages caused by the existence of flaws in magnetized bodies and, therefore, the greater will be its power of resolution in detecting such flaws.

An alternate construction for the detector coil is shown in Figs. 4 and 5 and comprises a core 31 formed by a plurality of wafer-like laminations 32 each being interrupted at the same location by an inverted substantially Y-shaped gap 33. Gap 33 provides the same increased flux concentration as the stepped separations between the ends of laminations 28. A double winding 34 similar to that shown in Fig. 2 completes the construction of the search coil.

As best shown in Fig. 6, facsimile recorder 25 comprises a revolving cylindrical drum 35 having a one-turn electrode 36 helically formed thereon. A second electrode 37 is also provided and consists of a longitudinal blade in substantially parallel relationship to the longitudinal axis of drum 35. A pair of rotating rolls 38 is arranged to feed an electrosensitive paper 39 between electrodes 36 and 37.

Prior to the actual manipulation of the apparatus described above, a D. C. current is passed through a conductor (not shown) arranged to be suitably inserted through the bore of tube 5. Upon removal of such conductor, a residual circular magnetic field remains in the ferromagnetic walls of tube 5 and such field is substantially perpendicular to longitudinally extending flaws. In the event a longitudinal magnetic field is desired for the maximum detectability of circumferential flaws, it may be obtained through the well-known technique of placing a current-carrying coil about the outer periphery of tube 5.

Next, arms 10 are adjusted so that rollers 11 thereon contact the inner bore surface of tube 5 and at the same time detector head 17 is adjusted to be in close proximity with the aforesaid bore surface. Then motor 8 is switched on to revolve shaft 6 and thereby detector head 17 at a constant rate while a gear reduction motor 50 connected to speed reducer 7 by means of a rope or chain 51 passing over a suitable pulley 52 advances such head longitudinally through the bore of tube 5 also at a constant rate. Thus, the movement of detector head 17 through tube 5 describes a helical path. Alternatively, the tube itself may be rotated while detector head 17 advances or is pulled longitudinally through the bore. In any event, the speed of rotation of recorder drum 35 is maintained at the same rate as that of detector head 17 by means of a suitable connection 53 between motor 8 and drum 53. Accordingly, since the pitch of the one-turn helix 36 on rotating drum 35 is equal to the width of the recording medium which is the electrosensitive paper 39, the spot formed by the area of intersection of the electrodes 36 and 37 sweeps across the recording medium in one revolution of drum 35 whereby the width of the record represents the circumference of the bore of tube 5. In addition, the length of the record is arranged to represent the length of tube 5, since the speed of travel of paper 39 through electrodes 36 and 37 is synchronized with the longitudinal movement of detector head 17 through tube 5 by means of a suitable connection 54 between motor 50 and rolls 38. As a result, paper 39 and the bore surface of tube 5 are in point to point correspondence.

As previously stated, whenever a flaw occurs in the physical structure of tube 5, the magnetic field in the immediate vicinity of the flaw will be correspondingly distorted. Then, when detector head 17 is passed through the area of such distortion, the amplitude of the induced voltage will be varied accordingly and thereby generate a signal across the terminals of winding 29. Such signal is duly increased by amplifiers 22 and 24 and then transmitted to electrodes 36 and 37 in facsimile recorder 25 whereupon electrosensitive paper 39 will change color at the point of intersection of the aforesaid electrodes. As a result, the flaws in tube 5 will be correspondingly marked in map-like fashion on electrosensitive paper 39 as indicated by numeral 40 in Figs. 1 and 6. The operator of the apparatus can, therefore, readily ascertain the exact shape, size, and location of all existing flaws in tube 5. This information permits the operator to readily evaluate the nature of the flaw so that cracks, for example, can be distinguished from blowholes or stress concentration in the material.

Due to the fact that the type of electrosensitive paper 39 here employed does not possess the necessary latitude for recording the entire intensity range in which flaws are detectable, a so-called "clipping circuit" 23 is included in the present apparatus. Clipping circuit 23 serves to limit the magnitude of the signals impressed upon recorder 25 thereby assuring that the smaller flaws can be amplified to the maximum recording level of paper 39 without simultaneously amplifying the larger flaws beyond the inherent capacity of the aforesaid paper. The clipping circuit is generally familiar to those skilled in the electronic art and need not be described more fully herein.

Since electrosensitive paper 39 is impregnated with an electrolytic solution, the current flow between electrodes 36 and 37 and through paper 39 in a given direction prints on a given side of the paper. Reversing the direction of current flow effects printing on the other side of paper 39. Since the signal produced by the herein described induction method of detection is A. C., printing is effected on both sides of paper 39. The point thereon where the printing density is reduced to zero, as printing stops on one side of paper 39 and is initiated on the other side, represents the location of the flaw since the reversal in the A. C. signal takes place as detector head 17 is passing over the flaw. Consequently, by holding the translucent paper 39 up to a light source, the path of the signal reversal will indicate the exact path of the flaw in tube 5.

Thus there is here provided a novel combination of a magnetic recording head and a facsimile recorder for use in the detection of inhomogeneities in magnetizable bodies in a manner far more sensitive and with greater definition than heretofore accomplished in the prior art. The method and apparatus of the present invention lends itself particularly well to the inspection of various size tubes on a mass production basis without requiring a highly skilled operator to interpret the results. Due to the extreme sensitivity and high definition of the type of search coil here utilized, minute flaws are individually detected so as to be distinguishable from one another and, therefore, can not be erroneously assumed as a larger flaw which might lead to unwarranted rejection of the inspected tube.

Further, by employing a facsimile recorder of the type customarily used to transmit data by means of radio communication, a visual picture of the various flaws in the inspected tubes is obtained from which the extent, shape, and location are clearly shown. The magnitude of each flaw is, moreover, readily discernible inasmuch as it varies directly with the intensity of the marks formed on the electrosensitive paper. Thus, if an inspector is provided with a standard reference sheet on which there is depicted the particular flaws which may be safely disregarded as not affecting the acceptability of the tubes under inspection, he need not possess the degree of skill and experience previously required for accepting or rejecting ferromagnetic tubes.

We claim:

1. In apparatus for determining the physical characteristics of inhomogeneities existing in magnetized ferromagnetic tubes, the combination of a movable search coil having a ferrous core and a low permeability gap therein, means for helically scanning said gap in intimate relationship with the bore surface of the tube to detect the existence of the areas of magnetic flux leakage resulting from inhomogeneities in the tube, means associated with said coil for converting magnetic energy to electrical signals corresponding to the rate of change and magnitude of the magnetic lines of flux leakage, a facsimile recorder having a revolving helical electrode and a stationary linear electrode, a roll of electrosensitive paper, means for passing said paper between said electrodes in synchronization with the rate of scanning movement of said coil, and means for visually marking said paper at the point of intersection of said electrodes to produce a trace depicting the shape, magnitude, and location of each inhomogeneity in the tube.

2. The combination defined in claim 1 wherein said ferrous core comprises a series of substantially cylindrical laminations, each lamination being of progressively increasing diameter to permit assembly of one into the other and having said non-magnetic gap at substantially the same location, said gaps thereby decreasing progressively in size from the innermost lamination to the outermost whereby the magnetic flux concentration is a maximum at the smallest gap area.

3. The combination defined in claim 1 wherein said ferrous core comprises a plurality of wafer-like laminations disposed in end-to-end relationship, each lamination having a substantially inverted Y-shaped gap therein occurring at the same location whereby the magnetic flux concentration is a maximum at the narrowest portion of said gap area.

4. Apparatus for depicting flaws in a magnetized tube comprising in combination, a nonmagnetic detector head having a ferrous search coil therein, said coil having a low permeability gap arranged to concentrate magnetic flux, means for helically advancing said detector head through the tube with said gap in close proximity to the bore surface thereof, means associated with said coil for converting magnetic energy to corresponding voltage signals only in the immediate vicinity of said gap, a rotating drum having a helically extending electrode formed on the outer periphery thereof in electrical connection with said search coil, a linear electrode disposed substantially parallel to the longitudinal axis of said drum in electrical connection with said search coil, feed means for passing electrosensitive paper between said electrodes at a rate proportional to the longitudinal travel of said detector head through the tube, means for synchronizing the revolving speed of said drum with the rotation of said detector head in the tube whereby the width of said electrosensitive paper represents the developed length of the bore circumference of the tube, and means for visually marking said paper at the point of intersection of said electrodes to produce a trace of each flaw in the tube wherein the density, the coordinate location, and the configuration of the trace respectively represent the depth, the circumferential and longitudinal location, and the shape of the flaw in the tube.

5. A method for simultaneously determining the coordinate location, shape, and depth of each inhomogeneity in a magnetized ferromagnetic body, comprising the steps of scanning a probe element in two coordinate dimensions over the surface of the body to incrementally detect variations in the magnetic flux pattern formed by each inhomogeneity therein, limiting the area of detection of the probe element to a relatively minute portion thereof, synchronizing the movement of a recording element with the coordinate movement of the probe element to effect a continuous correspondence in the positions thereof, actuating the recording element to produce a visual trace in response to each passage of the probe element through the magnetic flux pattern, and correlating the duration and darkness of each visual trace formed by the recording element with the coordinate extent and intensity of the magnetic energy in each detected increment thereof to form a facsimile record of the coordinate location and shape of each inhomogeneity in the body with the darkness of the record indicating the variation in dept of the inhomogeneity.

6. A method for simultaneously determining the circumferential location, shape, and depth of each inhomogeneity in a magnetized ferromagnetic tube, comprising the steps of helically scanning a probe element over the bore surface of the tube to incrementally detect variations in the magnetic flux pattern formed by each inhomogeneity therein, limiting the area of detection of the probe element to a relatively minute portion thereof, synchronizing the movement of a recording element in two coordinate dimensions with the circumferential and longitudinal movement of the probe element to effect a continuous correspondence in the positions thereof, converting the magnetic energy in successive detected increments to an electrical signal corresponding in duration to the circumferential and longitudinal extent of the magnetic flux pattern detected in each passage of the probe element therethrough and corresponding in amplitude to the intensity of the magnetic energy in each detected increment, actuating the recording element to produce a visual trace in response to the increments of electrical signal impressed thereon during each passage of the probe element through the magnetic flux pattern, and correlating the duration and darkness of each visual trace with the duration and amplitude of the electrical signals to form a facsimile record of the location and shape of each inhomogeneity in the tube with the darkness of the record indicating the variation in depth of the inhomogeneity.

References Cited in the file of this patent

UNITED STATES PATENTS

| Number | Name | Date |
|---|---|---|
| 1,782,462 | Chappuzeau et al. | Nov. 25, 1930 |
| 2,074,739 | Braddon | Mar. 23, 1937 |
| 2,133,725 | Sperry et al. | Oct. 18, 1938 |
| 2,308,159 | Drummond et al. | Jan. 12, 1943 |
| 2,434,531 | Wilson et al. | Jan. 13, 1948 |
| 2,457,131 | Curtis | Dec. 23, 1948 |
| 2,526,977 | Smith | Oct. 24, 1950 |
| 2,540,589 | Long | Feb. 6, 1951 |
| 2,563,254 | Lewis | Aug. 7, 1951 |